(12) United States Patent  
Pawley

(10) Patent No.: US 6,571,926 B2  
(45) Date of Patent: Jun. 3, 2003

(54) ONE-WAY CLUTCH ASSEMBLY FEATURING IMPROVED STRUT STABILITY

(75) Inventor: Brice Pawley, Midland, MI (US)

(73) Assignee: Means Industries, Inc., Saginaw, MI (US)

(*) Notice: Subject to any disclaimer, the term of this patent is extended or adjusted under 35 U.S.C. 154(b) by 0 days.

(21) Appl. No.: 09/782,071

(22) Filed: Feb. 12, 2001

(65) Prior Publication Data

US 2002/0108831 A1 Aug. 15, 2002

(51) Int. Cl.[7] .............................................. F16D 43/00
(52) U.S. Cl. ...................................... 192/45.1; 192/69.1
(58) Field of Search ............................... 192/69.1, 45.1, 192/46, 113.32, 103 B

(56) References Cited

U.S. PATENT DOCUMENTS

| 3,166,171 | A |   | 1/1965  | Schwerdhofer |           |
|-----------|---|---|---------|--------------|-----------|
| 5,449,057 | A |   | 9/1995  | Frank        |           |
| 5,597,057 | A |   | 1/1997  | Ruth et al.  |           |
| 5,806,643 | A |   | 9/1998  | Fitz         |           |
| 5,829,565 | A | * | 11/1998 | Fergle et al.| 192/45.1  |
| 5,853,073 | A |   | 12/1998 | Costin       |           |
| 5,918,715 | A | * | 7/1999  | Ruth et al.  | 192/46    |
| 5,927,455 | A | * | 7/1999  | Baker et al. | 192/36    |
| 5,954,174 | A | * | 9/1999  | Costin       | 192/103 B |
| 5,964,331 | A | * | 10/1999 | Reed et al.  | 192/113.32|
| 5,971,122 | A |   | 10/1999 | Costin et al.|           |
| 6,065,576 | A | * | 5/2000  | Shaw et al.  | 192/45.1  |
| 6,125,979 | A | * | 10/2000 | Costin et al.| 192/103 B |
| 6,125,980 | A | * | 10/2000 | Ruth et al.  | 192/46    |
| 6,129,190 | A | * | 10/2000 | Reed et al.  | 192/113.32|
| 6,186,299 | B1| * | 2/2001  | Ruth         | 192/113.32|
| 6,193,038 | B1| * | 2/2001  | Scott et al. | 192/46    |
| 6,244,965 | B1| * | 6/2001  | Klecker et al.| 192/43.1 |
| 6,332,520 | B1| * | 12/2001 | Costin       | 192/46    |
| 6,338,403 | B1| * | 1/2002  | Costin et al.| 192/107 T |
| 6,386,349 | B1| * | 5/2002  | Welch        | 188/82.2  |

FOREIGN PATENT DOCUMENTS

| JP | 60-22210    | 5/1985  |
| JP | 9-152006    | 6/1997  |
| JP | 9-291950    | 11/1997 |
| JP | 10-288228   | 10/1998 |
| JP | 11-2303     | 1/1999  |
| WO | WO 97/41367 | 11/1997 |
| WO | WO 99/45289 | 9/1999  |

* cited by examiner

Primary Examiner—Rodney H Bonck  
Assistant Examiner—David D. Le  
(74) Attorney, Agent, or Firm—Brooks & Kushman, P.C.

(57) ABSTRACT

A planar one-way clutch includes a pair of clutch members whose operative faces are disposed in close-spaced opposition, with each clutch face including a plurality of recesses defining respective load-bearing shoulders. A plurality of struts, disposed between the coupling faces of the members, and movable between a coupling position and a non-coupling position, mechanically couple the members for rotation when one member rotates in one direction relative to the other member, while further permitting clutch overrun when the one member rotates in the other direction relative to the other member. The recesses of one member each include a ramped surface opposite the member's load-bearing shoulder. Each ramped surface includes a convex surface portion which engages the struts during clutch overrun so as to urge the struts into the non-coupling position.

20 Claims, 3 Drawing Sheets

ONE-WAY CLUTCH ASSEMBLY FEATURING IMPROVED STRUT STABILITY

BACKGROUND OF THE INVENTION

1. Field of the Invention

The invention relates to "one-way" clutches wherein a plurality of struts provide a mechanical couple between the opposed clutch faces of a pair of coaxial rotatable members.

2. Background Information

Clutches are used in a wide variety of applications to selectively couple power from a first rotatable "driving" member, such as a driving disk or plate, to a second, independently-rotatable "driven" member, such as a driven plate or disk. In one known variety of clutches, commonly referred to as "one-way" or "overrunning" clutches, the clutch "engages" to mechanically couple the driving member to the driven member only when the driving member seeks to rotate in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One such known one-way clutch employs juxtaposed, nominally-coaxial driving and driven members featuring generally planar clutch faces in closely-spaced axial opposition. Such "planar" one-way clutches, as taught by Frank in U.S. Pat. No. 5,449,057 and Ruth et al. in U.S. Pat. No. 5,597,057, typically include a plurality of recesses formed in the face of the driving member and at least as many recesses formed in the face of the driven member. A thin, flat strut is carried within each of the driving member's pockets such that a first longitudinal end of each strut may readily engage and bear against a shoulder defined by its respective recess of the driving member. The strut's second, opposite longitudinal end is urged toward and against the face of the driven member, for example, by a spring positioned beneath the strut in the recess of the driving member.

When the driving member rotates in the first direction relative to the driven member, the second end of at least one strut engages and thereafter bears against a shoulder defined by a recess of the driven member, whereupon the strut is placed in compression and the driven member is coupled for rotation with the driving member. When the driving member rotates in the second direction relative to the driven member, ramped surfaces defined by other portions of the driven member's recesses urge the second end of each strut back towards the driving member, whereupon the driving member is permitted to freely rotate in the second direction relative to the driven member.

This periodic engagement of the second end of each strut with the ramped surfaces of the driven member's clutch face during clutch overrun may generate a noise or "ratcheting" sound that is often associated with one-way clutches. Known approaches to reduce this ratcheting sound during clutch overrun include modifications to the design of the strut, including reductions in the strut's inertial mass; modifying the spring forces exerted on the strut; and the use of various motion-damping fluid in the space between the clutch faces to thereby better control the dynamics of the strut during clutch overrun. However, further improvement in noise reduction during overrun is desirable, particularly as other clutch components, such as the driven member, become fabricated from materials exhibiting different noise-transmissive characteristics, for example, powdered metal.

SUMMARY OF THE INVENTION

It is an object of the invention to provide a one-way clutch assembly which features improved noise characteristics Under the invention, a one-way clutch assembly includes a first member rotatable about a first axis, wherein the first member includes a coupling face having a recess defining a load-bearing shoulder; and a second member, also rotatable about the first axis, wherein the second member includes a coupling face, positioned in close-spaced opposition with the coupling face of the driving member, that defines a reference surface which, in an exemplary embodiment, is generally normal to the first axis. The coupling face of the driven member includes a plurality of recesses, with each recess defining a load-bearing shoulder and a ramped surface opposite to the shoulder. The ramped surface includes a convex surface portion that tangentially intersects the reference surface and, preferably, also tangentially intersects a further generally flat surface portion of the ramped surface within the recess of the driving member. A base surface of the recess is also preferably disposed between the flat surface portion and the shoulder of the recess.

The clutch assembly in accordance with the invention also includes a strut disposed between the coupling faces of the members. Each strut is moveable between a first position characterized by simultaneous abutting engagement of a respective end of the strut with a respective shoulder of each member, and a second position characterized by non-engagement of the strut with at least the second member. Significantly, under the invention, the convex surface portions of the ramped surfaces periodically engage the strut upon rotation of the second member in a first direction relative to the first member to urge the strut toward the second position. In this manner, each strut is "cammed" by the convex surface portions to the second position, resulting in a reduction in generated noise during overrun while achieving improved strut stability.

While the invention contemplates any suitable geometry for the convex surface portion of the ramped surfaces, in accordance with a feature of the invention, the convex surface is preferably defined by a curved portion of the ramped surface and, most preferably, the curved portion has a substantially constant radius of curvature. Thus, in a preferred embodiment, wherein each strut includes a pair of diametrical member-engaging ends separated by a nominal longitudinal dimension d, the substantially constant radius of curvature is greater than about d/10.

While an exemplary clutch assembly in accordance with the invention is illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT

Figure 1:
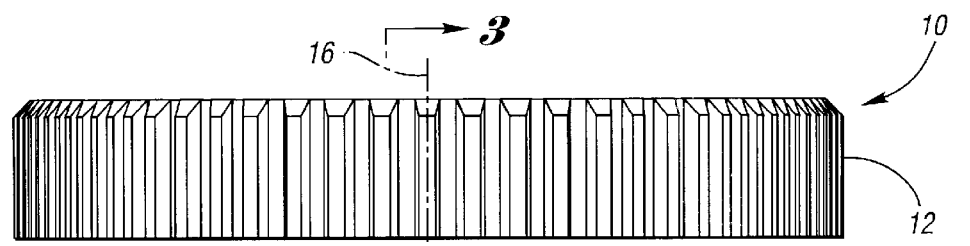
FIG. 1 is a side elevational view of an exemplary planar one-way clutch assembly in accordance with the invention.

Referring to the Drawings, an exemplary clutch assembly 10 in accordance with the invention includes a driving member 12 and a driven member 14, both of which are rotatable about a common axis 16. The exemplary clutch assembly 10 further includes a plurality of struts 18, disposed between the driving member 12 and the driven member 14, which operate to mechanically couple the driving member 12 to the driven member 14 only when the driving member 12 rotates in a first direction 20 relative to the driven member 14.

More specifically, in the exemplary clutch assembly 10, the driving member 12 has a clutch face 22 that defines a first reference surface 24 that extends generally normal to the driving member's rotational axis 16. A plurality of recesses 26 are defined in the clutch face 22 of the driving member 12, with each recess 26 including a load-bearing shoulder 28 that is operative to abuttingly engage a first end 30 of a given strut 18 when the driving member 12 rotates in the first direction 20. And, while the invention contemplates any suitable configuration for the recesses 26 of the driving member 12, in the exemplary clutch assembly 10, each recess 26 of the driving member 12 is adapted to receive a respective one of the assembly's struts 18, such that the struts 18 are nominally carried by the driving member 12 for rotation therewith about the axis 16.

Figure 2:
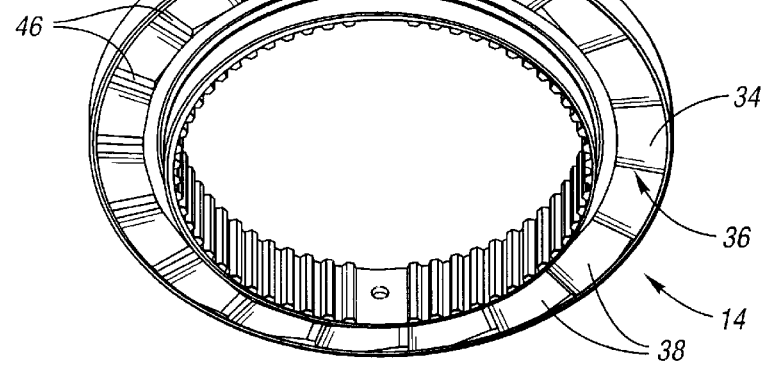
FIG. 2 is an exploded view in perspective of the assembly of FIG. 1.
Figure 2:
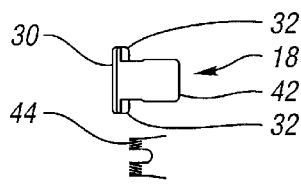
Figure 2:
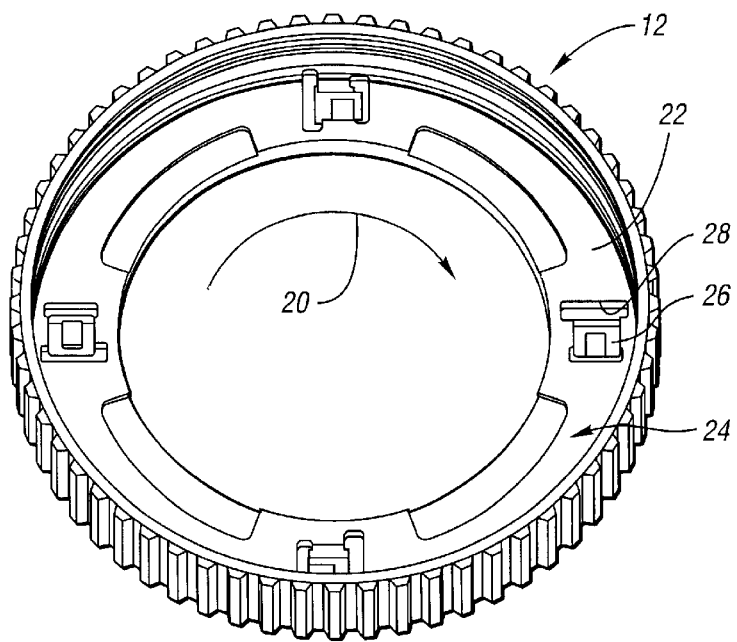

Similarly, while the invention contemplates use of any suitable arrangement whereby the first end 30 of a given strut 18 is nominally positioned within the strut's respective recess 26 in the driving member's clutch face 24, as seen in FIG. 2, each strut 18 of the exemplary clutch assembly 10 includes a pair of oppositely-projecting ears 32 which extend laterally from the strut 18 proximate to its first end 30. The strut's ears 32 cooperatively engage complementary radially-inner and radially-outer surfaces of the driving member's recesses to thereby nominally position the first end 30 of the strut opposite the shoulder 28 of the strut's respective recess 26.

The driven member 14 similarly includes a clutch face 34, in close-spaced opposition to the clutch face 22 of the driving member 12, that likewise defies a reference surface 36 that extends generally normal to the driven member's rotational axis 16. The driven member's clutch face 34 also includes a plurality of recesses 38 which, in the exemplary clutch assembly 10, greatly exceed the number of recesses 26 defined in the driving member 12 to reduce clutch "backlash" upon initial rotation of the driving member 12 in the first rotational direction 20 relative to the driven member 14. Each of the driven member's recesses 38 is adapted to receive the free, second end 42 of a given strut 18 when the strut's second end 42 is urged into the recess 38, for example, by a spring 44 seated beneath the strut 18 in the driving member's recess 26. Each of the driven member's recesses 38 includes a load-bearing shoulder 46 that is operative to abuttingly engage the second end 42 of a given strut 18 when the driving member 12 rotates in the first direction 20 relative to the driven member 14.

Figure 3:
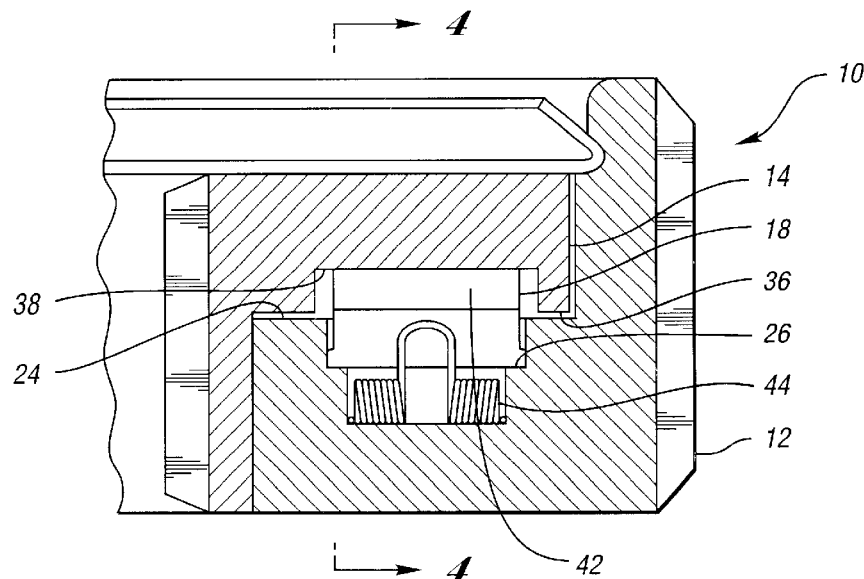
FIG. 3 is a partial tangential sectional view of the exemplary clutch assembly, taken along line 3—3 of FIG. 1, illustrating a given strut in a first, power-transmitting position wherein each end of the strut engages a respective load-bearing shoulder of the assembly's driving and driven members.
Figure 4:
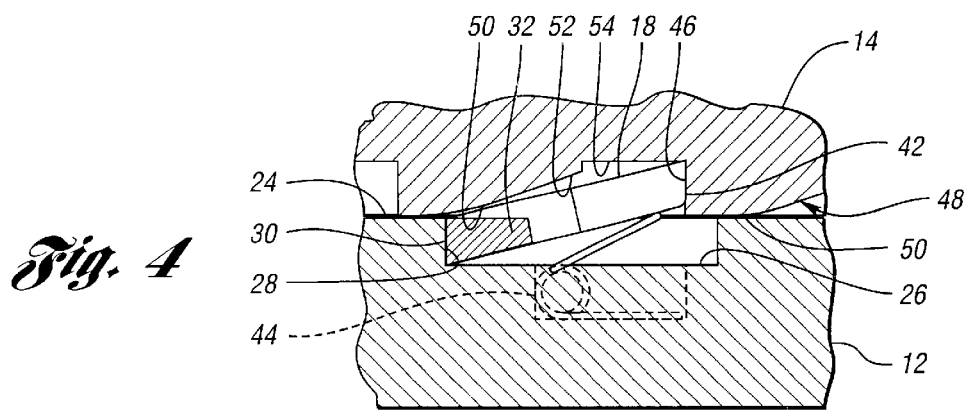
FIG. 4 is a sectional view of the exemplary clutch assembly of FIG. 1 taken along line 4—4 thereof.
Figure 5:
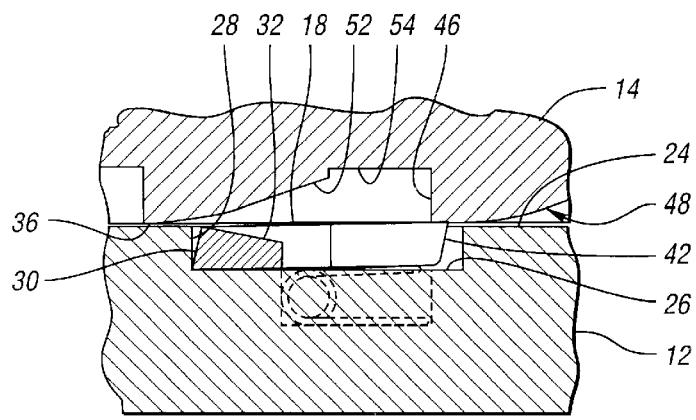
FIG. 5 is a sectional view of the exemplary clutch assembly of FIG. 1, similar to that of FIG. 4, illustrating the given strut in a second position.

As seen more clearly in the enlarged partial-sectional views of the clutch assembly 10 shown in FIGS. 3–5, each strut 18 is movable between a first position and a second position. The first position of each strut 18 is characterized by engagement of the strut 18 with respective load-bearing shoulders 28,46 of the assembly's driving and driven members 12,14 (as illustrated in FIG. 4). The second position of each strut 18 is characterized by the non-abutting engagement of the second end 42 of the strut 18 with the recesses 38 of the driven member 14 (as illustrated in FIG. 5). While the spring 44 operates to urge its respective strut 18 toward the first position, it will be appreciated that the invention contemplates use of other structures or configurations for nominally urging each strut 18 toward the first position, including, without limitation, any suitable orientation of the recesses 26 on the driving member 12 whereby the struts 18 are urged toward the first position by centrifugal forces upon rotation of the driving member 12 in the first rotational direction 20.

Also as seen in FIGS. 3–5, under the invention, each recess 38 in the driven member's clutch face 34 also defines a ramped surface 48 positioned opposite the load-bearing shoulder 46. The ramped surface 48 includes a convex surface portion 50 that tangentially intersects the reference surface 36 of the driven member 14. Under the invention, the convex surface portion 50 of each of the driving member's recesses 38 is operative, upon rotation of the driven member 14 in the first rotational direction 20 relative to the driving member 12. to periodically urge each strut 18 toward the second position. More specifically, the convex surface portion 50 forms a camming surface that operates to urge each strut 18 toward the second position during clutch overrun while otherwise imparting a lesser rotational velocity on the strut 18 than is effected by known prior art ramped surfaces. In this manner, the struts 18 are urged toward the second position while generating substantially reduced levels of the "ratcheting" noise characteristic of known one-way clutch assemblies.

As a further benefit, the engagement of the convex surface portion 50 of the ramped surfaces 48 of the driven member 14 achieve greater strut stability during clutch overrun. As yet another benefit, the convex surface portion 50 of the ramped surfaces 48 of the driven member 14 allows a given strut 18 to "tip in" to a given recess 34 more quickly as the driving member 12 rotates in the first rotational direction 20 relative to the driven member 14, thereby improving clutch assembly lock-up capability. It will be appreciated that the convex surface portion 50 of the ramped surfaces 48 of the driving member 14 are formed by any suitable manner, for example, as a "coined-in" or a "cast-in" feature, or as a "tooled-in" feature, as appropriate.

Figure 6:
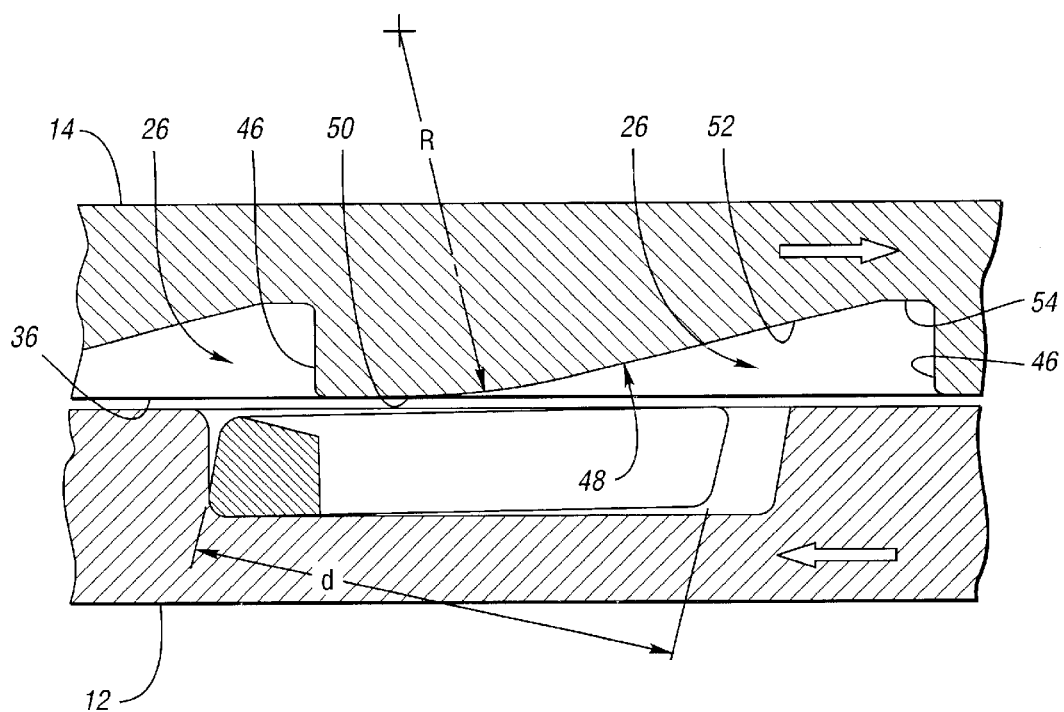
FIG. 6 is a schematic view similar to that of FIG. 5, illustrating the geometries employed in the exemplary clutch assembly.

In the exemplary clutch assembly 10, the convex surface portion 50 of the ramped surfaces 48 of the driving member 14 are defined, at least in part, by a reference curve having a substantially constant radius of curvature R, as illustrated in FIG. 6. Under the invention, for a given strut length d, as measured between the strut's diametrical member-engaging ends 30,42, the substantially constant radius of curvature is preferably greater than about d/10.

As seen in FIG. 6, in accordance with another feature of the invention, the ramped surface 48 of each of the driven member's recesses 34 includes a flat surface portion 52 that also tangentially intersects the convex surface portion 50. Each recess 34 of the driven member 14 preferably also includes a base surface 54 defined between the shoulder 46 and the flat surface portion 52 of the ramped surface 48. In the exemplary clutch assembly 10, the flat surface portion 52 cooperates with the base surface 54 to allow the second end 42 of a given strut 18 to suitably rotate into a given recess 38 of the driven member 14, as the driving member 12 rotates in the first rotational direction 20 relative to the driven member 14, before engaging the load-bearing shoulder 46, further improving clutch assembly lock-up.

In the exemplary clutch assembly 10, a quantity of lubricating fluid (not shown) is disposed between the driving and driven members 12,14 to impart additional stability to the struts 18 through fluid-damping, while further advantageously serving to reduce component wear. Significantly, however, the presence of the convex surface portions 50 and the attendant increase in strut stability during clutch overrun permits use of a substantially reduces quantity of such lubricating fluid, when compared to known fluid-lubricated clutches. Such a reduction in the required quantity of lubricating fluid includes such potential correlative benefits, for example, as reduced fluidic drag on the driven member 14 during clutch overrun, a reduced oil supply requirement, and less stringent requirements for peripheral oil seals. It will be appreciated, however, that the invention contemplates use of any other suitable mechanism for reducing component wear, including manufacture of one or both of the struts 18 and the ramped surfaces 48 of the driven member 14 from a self-lubricating material.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the struts of the exemplary clutch assembly 10 are nominally carried by the driving member, it will be appreciated that the invention contemplates carrying the struts in the recesses of the driven member, whereupon each recess of the driving member will define a ramped surface that includes a curved portion in accordance with the invention. Similarly, in the event that the struts are carried by a separate element that is itself disposed between the clutch faces of the driving and driven members, the invention contemplates providing the recesses of either or both of the driving and driven members with the prescribed curved ramped surface. It will also be appreciated that the invention contemplates use of the curved ramped surface in conjunction with other structures operative to urge a given strut towards the first, member-coupling position, such as a retainer plate that is positioned between the clutch faces of the driving and driven members.

What I claim is:

1. In a one-way clutch including:
   a pair of members rotatable about a first axis, each member including a coupling face in close-spaced opposition with the coupling face of the other member, wherein each coupling face includes at least one recess that defines a respective load-bearing shoulder, and wherein the coupling face of one member defines a reference surface,
   a strut disposed between the coupling faces of the members, the strut being moveable between a first position characterized by abutting engagement of the strut with a respective shoulder of each member, and a second position characterized by non-abutting engagement of the strut with at least one member, and
   wherein each recess of one member includes a respective ramped surface opposite the shoulder,
   the improvement wherein the ramped surface includes a convex surface portion that tangentially intersects the reference surface of the one member, the convex surface portion of the ramped surface being operative to periodically urge the strut toward the second position upon rotation of the one member in a first direction relative to the other member.

2. The clutch of claim 1, wherein the convex surface portion is defined at least in part by a reference curve having a substantially constant radius of curvature.

3. The clutch of claim 2, wherein the strut includes a pair of diametrical member-engaging ends separated by a nominal longitudinal dimension d, and wherein the substantially constant radius of curvature is greater than d/10.

4. The clutch of claim 1, wherein the ramped surface of each recess of the one member includes a flat surface portion that tangentially intersects the convex surface portion.

5. The clutch of claim 4, wherein for each ramped surface. the flat surface portion extends over a greater distance than the convex surface portion.

6. The clutch of claim 1, wherein each recess of the one member further includes a base surface defined between the shoulder and the flat surface portion of the ramped surface.

7. The clutch of claim 1, wherein the reference surface is generally normal to the first axis.

8. The clutch of claim 7, wherein the reference surface extends between adjacent recesses of the one member.

9. The clutch of claim 7, wherein the ramped surface of each recess of the one member includes a flat surface portion that tangentially intersects the convex surface portion, wherein each convex surface portion is disposed between the reference surface and a respective flat surface portion.

10. The clutch of claim 9, wherein the reference surface extends between adjacent recesses of the one member and defines a generally flat surface between the adjacent recesses.

11. The clutch of claim 9, wherein for each ramped surface, the flat surface portion extends over a greater distance than the convex surface portion.

12. The clutch of claim 1, wherein the ramped surface of each recess of the one member includes a flat surface portion that tangentially intersects the convex surface portion, wherein the flat surface portion defines a majority of the ramped surface.

13. A one-way clutch including:
a first member rotatable about a first axis, the first member including a coupling face having a recess defining a load-bearing shoulder;
a second member rotatable about the first axis, the second member including a coupling face positioned in close-spaced opposition with the coupling face of the first member, wherein the coupling face of the second member defines a reference surface generally normal to the first axis, and wherein the coupling face of the second member includes a plurality of recesses, each recess defining a load-bearing shoulder and a ramped surface opposite to the shoulder, the ramped surface including a convex surface portion that tangentially intersects the reference surface; and
a strut disposed between the coupling faces of the members, each strut being moveable between a first position characterized by simultaneous abutting engagement of a respective end of the strut with a respective shoulder of each member, and a second position characterized by non-engagement of the strut with at least the second member,
wherein the convex surface portions of the ramped surfaces periodically engage the strut upon rotation of the second member in a first direction relative to the first member to urge the strut toward the second position.

14. The clutch of claim 13, wherein the convex surface is defined by a curved portion of the ramped surface, the curved portion having a substantially constant radius of curvature.

15. The clutch of claim 14, wherein the strut includes a pair of diametrical member-engaging ends separated by a nominal longitudinal dimension d, and wherein the substantially constant radius of curvature is greater than d10.

16. The clutch of claim 13, wherein the ramped surface of each recess of the second member includes a flat surface portion that tangentially intersects the convex surface portion.

17. The clutch of claim 16, wherein for each ramped surface, the flat surface portion extends over a greater distance than the convex surface portion.

18. The clutch of claim 13, wherein each recess of the second member further includes a base surface defined between the shoulder and the flat surface portion of the ramped surface.

19. The clutch of claim 13, wherein the reference surface extends between adjacent recesses of the second member and defines a generally flat surface between the adjacent recesses.

20. The clutch of claim 13, wherein the ramped surface of each recess of the second member includes a flat surface portion that tangentially intersects the convex surface portion, wherein the flat surface portion defines a majority of the ramped surface.

* * * * *